United States Patent [19]

Testa et al.

[11] 4,043,874

[45] Aug. 23, 1977

[54] PROCESS FOR SEPARATING AND RECOVERING THE CONSTITUENTS OF AN EXHAUSTED SOLVENT MIXTURE USED FOR CLEANSING REACTORS FOR THE POLYMERIZATION OF VINYL CHLORIDE

[75] Inventors: Francesco Testa, Bresso (Milan); Antonio Bigliani, Saronno (Varese), both of Italy

[73] Assignee: Societa' Italiana Resine S.I.R. S.p.A., Milan, Italy

[21] Appl. No.: 751,250

[22] Filed: Dec. 16, 1976

[30] Foreign Application Priority Data

Dec. 23, 1975 Italy .................................. 30688/75

[51] Int. Cl.² .......................... B01D 3/36; B08B 3/08
[52] U.S. Cl. ..................................... 203/47; 203/79; 203/92; 203/95; 159/47 R; 134/12; 134/13; 260/561 R; 260/674 A; 528/484; 528/500
[58] Field of Search ...................... 528/484, 499, 500; 203/92, 95, 47, 96, 79, 85, 91; 260/674 A, 561 R; 134/22 R, 22 C, 10, 38, 40, 12, 13; 159/47 R

[56] References Cited

U.S. PATENT DOCUMENTS

| 2,530,144 | 11/1950 | Bannon | 528/484 |
|---|---|---|---|
| 3,352,840 | 11/1967 | Oktay | 528/484 |
| 3,975,230 | 8/1976 | Yang et al. | 203/96 |
| 3,997,360 | 12/1976 | Testa et al. | 134/22 R |
| 3,998,655 | 12/1976 | Benetta et al. | 134/22 R |
| 4,009,048 | 2/1977 | Jensen et al. | 203/47 |
| Re. 27,432 | 7/1972 | Torrenzano et al. | 134/38 |

*Primary Examiner*—Wilbur L. Bascomb, Jr.
*Attorney, Agent, or Firm*—Sughrue, Rothwell, Mion, Zinn and Macpeak

[57] ABSTRACT

The constituents of an exhausted toluene-dimethylformamide solvent mixture used for removing polyvinyl chloride deposits from polymerization reactors, are separated by adding water to said mixture and distilling off toluene, thereby to obtain a distillation residue having a water content of at least 2 wt.% and a toluene content not exceeding 10 wt.%, precipitating the polymer by cooling the distillation residue, adding a further amount of water, distilling off any toluene present, recovering the precipitate and distilling the residual aqueous solution to recover the dimethylformamide.

7 Claims, No Drawings

PROCESS FOR SEPARATING AND RECOVERING THE CONSTITUENTS OF AN EXHAUSTED SOLVENT MIXTURE USED FOR CLEANSING REACTORS FOR THE POLYMERIZATION OF VINYL CHLORIDE

The present invention relates to a process for separating and recovering the constituents of an exhausted solvent mixture used for cleansing reactors for the polymerization of vinyl chloride.

Our co-pending Patent application Ser. No. 603,395, now U.S. Pat. No. 3,997,360 relates to a process for cleansing reactors for the polymerization of vinyl chloride, by removal with a solvent mixture of the polymer accretions formed on the internal walls and related equipment during said polymerization.

This process consists essentially in contacting said polymer accretions with a solvent mixture constituted of toluene and dimethylformamide in a weight ratio of toluene to dimethylformamide of from 50:50 to 90:10, at a temperature of at least 60° C and for a time sufficient to dissolve said accretions.

The best results are obtained by using a toluene/dimethylformamide weight ratio of from 55:45 to 75:25 and by operating at a temperature of from 70° to 100° C.

Said solvent mixtures are quite advantageous both on account of their high dissolution velocity and because they can be used in a very large number of cleansing cycles.

One of the major problems in the cleansing of reactors by means of a solvent is due to the gradual loss in efficiency of the solvent used. This phenomenon is connected both with the amount of dissolved polymer and with the water compatibility of the solvent mixture, i.e., water which is accumulating in the solvent during the dissolution operations.

In the case of a toluene-dimethylformamide solvent mixture, the water present acts as a powerful delayer of the degradation of the vinyl chloride polymers.

As a consequence, according to the process of said Patent Application, it is advantageous to use solvent mixtures containing at least a moderate amount of water, prferably at least 0.7% by weight of water.

However it must be kept in mind also that the dissolution velocity of the polymer decreases rapidly for water concentrations higher than 5-6% by weight and dissolution tends to stop for concentrations higher than 7.0% by weight.

Therefore when the solvent mixture has accumulated an amount of water which is nearing 7% by weight and which, however, does not exceed this value, and an amount of polymer not higher than 10% by weight, and generally about 5%, its continued use can no longer be considered satisfactory and it is conveyed to recovery.

According to the present invention, it is possible to recover the constituents of such exhausted solvent mixtures in a very simple way.

Thus, the invention provides a process for separating and recovering the constituents of an exhausted toluene-dimethylformamide solvent mixture used for cleansing surfaces of equipment used for the polymerization of vinyl chloride by removing the deposits of polymer therefrom, which comprises:

a. adding water to said exhausted solvent mixture and then distilling off toluene in the form of an azeotropic mixture with water, the amount of added water and the amount of toluene distilled off being so adjusted as to ensure in the distillation residue a water content of at least 2.5% by weight and a toluene content not exceeding 10% by weight.

b. cooling said distillation residue, thereby to precipitate the polymer present therein;

c. adding to the resulting suspension water in an amount of at least 20% of the weight of the dimethylformamide present therein;

d. distilling off any toluene still present in the suspension;

e. recovering the precipitated polymer from the residual suspension obtained in (d) and recovering by distillation the dimethylformamide from the resulting aqueous solution.

If the toluene is present in the distillation residue in an amount higher than 10% by weight, a soft and sticky precipitate is obtained, which creates soiling and separation difficulties. The distillaton of stage (a) is generally carried out until at least 90% of the toluene present in the solvent mixture is distilled off.

The toluene-water azeotrope is condensed and subsequently separated in a separator, for example in a florentine.

In order to avoid any thermal degradation of the polymer present in the mixture, it is preferable to perform the azeotropic distillation at a pressure ranging from 300 to 500 mm Hg.

When the distillation residue contains less than 2.5% by weight of water, precipitation of the polymer does not occur in stage (b), not even when the temperature reaches room temperature (20°-25° C).

On the other hand the form of the precipitate is strictly dependent on the temperature at which the polymer separation occurs. In particular, a sticky form of polymer which curdles in coarse granules is obtaned at very high temperatures. On the contrary, at lesser temperatures the polymer precipitates in a fine form easily separable.

As the temperature at which precipitation occurs is a direct function of the amount of water present in the distillation residue, it is not convenient to operate with too great an amount of water.

In practice, with too little water substantially no vinyl polymer is precipitated, while with too much water the precipitation occurs at high temperature with the formation of sticky and coarse granules.

For these reasons, the amount of water added in stage (a) is preferably so adjusted as to ensure in the distillation residue a water content of from 2.5 to 7% by weight. A precipitate with satisfactory characteristics is then obtained by cooling the distillation residue to a temperature of from 90° to 25° C.

The best results are attained when the water concentration in the distillation residue is from 3.5 to 6% by weight, the distillation residue being then cooled to a temperature of from 60° to 35° C.

The water required is added to the exhausted mixture before the azeotropic distillation of stage (a), together with the amount of water necessary for the distillation of the azeotrope toluene-water.

In fact, if the water necessary to bring the water concentration of the distillation residue into the range indicated is added directly to the said residue before the polymer precipitation, this last occurs with difficulty and an undesirable formation of precipitate curdles occurs.

To favour the polymer separation from the distillation residue and in particular from the dimethylformamide, a further amount of water, equal to at least 20% of the weight of the dimethylformamide present and preferably in an amount equal to a 1:1 ratio by weight to the same, is added in stage (c).

The water acts as an extracting medium for the dimethylformamide incorporated into the precipitated polymer, thickening the latter.

The suspension is then heated again to ebullition so as to remove by azeotropic distillation with water any toluene still present and to facilitate the diffusion of the dimethylformamide into the aqueous phase.

The precipitate is then easily separated from the aqueous phase by conventional methods, such as, for example, decantation, filtration or centrifugation.

The dimethylformamide is recovered from the aqueous phase by a conventional distillation method.

By operating with the process of the present invention, it is possible to separate quantitatively the toluene and the dimethylformamide from the exhausted solvent mixtures and to recover at the same time the polymer present in said mixtures in the form of a precipitate sufficiently subdivided and easily filterable.

EXAMPLE 1

7,000 kg of an exhausted mixture, coming from washing autoclaves for vinyl chloride polymerization, having the following composition (the percentages are given by weight): Toluene = 59.8; Dimethylformamide = 32.1; Polyvinyl chloride (PVC) = 4.0; Water = 4.0; Tin mercaptide = 0.1%, are loaded in a 9 cubic metres enameled reactor supplied with a thermostat jacket, stirrer and antislosh baffle and connected to a condenser and florentine.

Then 760 kg of water are added.

The mass maintained under stirring is heated at a pressure of 460 mm Hg.

The azeotropic distillation begins when the liquid mass has reached the temperature of 70° C.

The vapor is condensed and then separated in layers in the florentine for the recovery of toluene.

When the temperature of the boiling liquid reaches 115° C, the amount of condensate is equal to about 65% of the initial mass and the residual mass in the reactor contains 5.2% of water and 7.5% of toluene.

At this point the vacuum is broken and cooling is started.

With the temperature decrease, the mass becomes gradually more viscous. When a temperature of 55° C is reached, a sharp separation into two phases, consisting of a semisolid phase dispersed in a liquid phase, is observed. The separation occurs with a sudden decrease in viscosity.

The semisolid dispersed phase is constituted by gelatinous particles of PVC containing toluene and dimethylformamide.

The dispersing phase is constituted practically of dimethylformamide alone.

At this point about 2,000 l of water are added to the two-phase mass and the mass is stirred and heated again and brought to ebullition under vacuum for the recovery of the residual toluene.

When the temperature of the boiling liquid reaches 100° C, the mass is cooled to room temperature (20°–25° C) and transferred to a decanter.

The liquid phase constituted by dimethylformamide and water in an approximately 1:1 ratio is rectified in a plate distillation column for the recovery of dimethylformamide.

The residual solid (PVC) is in the form of rather fine granules having the size distribution given in column 1 of the Table.

EXAMPLE 2

The operation is carried out as in Example 1, but the toluene distillation is continued until 70% of the initial mass is distilled off.

The residual mass contains 3.8 wt.% of water and 4 wt.% of toluene.

Then the cooling is started. When the temperature reaches 45° C, the phase separation occurs.

Then the operation is continued as in Example 1.

The PVC thus recovered is in the form of very fine granules having the size distribution given in the Table.

EXAMPLE 3 (COMPARATIVE)

The operation is again carried out as in Example 1, but loading an initial amount of 614 Kg of water into the enameled reactor together with the exhausted mixture.

Then the toluene azeotropic distillation is performed as in Example 1 and is stopped when an amount of condensed distillate equal to about 65% of the initial mass has been collected. The residual mass in the reactor contains 1.9% by weight of water and 7.9% by weight of toluene.

At this point the vacuum is broken and cooling is started. The mass does not separate into two phases on lowering the temperature, not even when the temperature reaches room temperature (20°–25° C). Therefore in this case it is not possible to separate the polymer.

EXAMPLE 4

The operation is carried out as in Example 1, but loading an initial amount of 910 Kg of water into the enameled reactor together with the exhausted mixture.

Then the toluene azeotropic distillation is carried out under the conditions of Example 1. When the temperature of the boiling liquid reaches 115° C, the amount of condensate is equal to about 65% of the initial mass and the residual mass in the reactor contains 9.7% by weight of water and 3.0% by weight of toluene.

At this point the vacuum is broken and cooling is started. When the temperature reaches 95° C, the separation into phases is observed.

The phase containing the polymer is in coarse, sticky curds which have a tendency to adhere to each other and to the surfaces of the autoclave.

After completing the operation cycle as in Example 1, the reactor is unloaded with difficulty and is heavily encrusted.

A polymer having a size distribution given in column 3 of the Table is obtained.

TABLE

| Size (mm) | Ex. 1 (%) | Ex. 2 (%) | Ex. 4 (%) |
| --- | --- | --- | --- |
| >0.10 | 2.5 | 60 | — |
| 0.11–0.50 | 22.5 | 18 | — |
| 0.51–1.00 | 25.0 | 12 | 2 |
| 1.01–2.00 | 20 | 9.5 | 4 |
| 2.01–5.00 | 30 | 0.5 | 10 |
| 5.01–10.00 | — | — | 50 |
| 10.01–50.00 | — | — | 30 |
| <50.00 | — | — | 4 |

What we claim is:

1. A process for separating and recovering the constituents of an exhausted toluene-dimethylformamide solvent mixture used for cleansing surfaces of equipment used for the polymerization of vinyl chloride by removing the deposits of polymer therefrom, which comprises:

a. adding water to said exhausted solvent mixture and then distilling off toluene in the form of an azeotropic mixture with water, the amount of added water and the amount of toluene distilled off being so adjusted as to ensure in the distillation residue a water content of at least 2.5% by weight and a toluene content not exceeding 10% by weight;

b. cooling said distillation residue, thereby to precipitate the polymer present therein;

c. adding to the resulting suspension water in an amount of at least 20% of the weight of the dimethylformamide present therein;

d. distilling off any toluene still present in the suspension;

e. recovering the precipitated polymer from the residual suspension obtained in (d) and recovering by distillation the dimethylformamide from the resulting aqueous solution.

2. The process of claim 1, wherein said azeotropic mixture of (a) is distilled off at a pressure of from 300 to 500 mm Hg.

3. The process of claim 1, wherein said amount of added water of (a) is such as to ensure in the distillation residue a water content of from 2.5 to 7% by weight.

4. The process of claim 3, wherein the distillation residue is cooled down to a temperature of from 90° to 25° C.

5. The process of claim 1, wherein said amount of added water of (a) is such as to ensure in the distillation residue a water content of from 3.5 to 6% by weight.

6. The process of claim 5, wherein the distillation residue is cooled to a temperature of from 60° to 35° C.

7. The process of claim 1, wherein the weight ratio between the water added in (c) and the dimethylformamide present in the suspension is 1:1.

* * * * *